United States Patent [19]

Veach

[11] Patent Number: 4,743,820
[45] Date of Patent: May 10, 1988

[54] ELECTRONIC APPLIANCE CONTROL

[76] Inventor: Wayne Veach, 7413 Rolling River Pkwy., Bellevue, Tenn. 37221

[21] Appl. No.: 801,601

[22] Filed: Nov. 25, 1985

Related U.S. Application Data

[63] Continuation of Ser. No. 325,232, Nov. 27, 1981.

[51] Int. Cl.$^4$ .............................................. G05B 19/06
[52] U.S. Cl. ...................................... 318/578; 318/452;
200/27 B; 200/37 A; 200/38 B; 307/141;
134/58 D; 68/12 R
[58] Field of Search ................ 200/27 B, 37 A, 38 B;
318/452, 485, 578; 307/141, 141.4; 68/12 R;
134/58 D; 328/72, 75; 371/29; 364/140, 143,
400; 340/309.4

[56] References Cited

U.S. PATENT DOCUMENTS

| 3,798,465 | 3/1974 | Guth | 307/141 |
|---|---|---|---|
| 4,161,679 | 7/1979 | Kohn et al. | 318/685 |
| 4,195,500 | 4/1980 | Tobita et al. | 68/12 R |
| 4,254,460 | 3/1981 | Achter et al. | 307/141 X |
| 4,362,953 | 12/1982 | Bolin | 307/141 |
| 4,370,566 | 1/1983 | Perry et al. | 307/141 |

Primary Examiner—Bentsu Ro
Attorney, Agent, or Firm—Pearne, Gordon, McCoy & Granger

[57] ABSTRACT

An electric appliance control system is disclosed in which a logic controlled, solid-state, electronic system is used in conjunction with a mechanical switching device in the form of a cam disc operating a plurality of cam-operated switches. The control system combines the capabilities of performing complicated and numerous operational programs with the reliability of the cam-operated mechanical switching device.

4 Claims, 3 Drawing Sheets

Fig-3

| | | BLOWER 51 | WATER VALVE 52 | HEATER 53 | MOTOR MAIN 54 | WASH PHASE 55 | DRAIN PHASE 56 | DET. CUP 57 | RINSE COND. 58 | | | SANI-WASH | HEAVY WASH | REG, DUAL | REG, LOENER | RINSE-HOLD | POWER-DRY |
|---|---|---|---|---|---|---|---|---|---|---|---|---|---|---|---|---|---|
| DRAIN | 1 | | | | ● | | ● | | | | | | | | | | |
| FILL #1 | 2 | | ● | | | ○ | ○ | | | | | | | | | | |
| WASH HOT | 3 | | | ● | ● | ● | | | | | | | | | | | |
| WASH COLD | 4 | | | | ○ | ● | | | | | | | | | | | |
| STOP | 5 | | | | | ○ | ○ | | | | | | | | | | |
| DRAIN | 6 | | | | ● | | ● | | | | | | | | | | |
| FILL #2 | 7 | | ● | | | ○ | ○ | | | | | | | | | | |
| WASH HOT | 8 | | | ● | ● | ● | | | | | | | | | | | |
| WASH COLD | 9 | | | | ● | ● | | | | | | | | | | | |
| STOP | 10 | | | | | ○ | ○ | | | | | | | | | | |
| DRAIN | 11 | | | | | | | | | | | | | | | | |
| FILL #3 | 12 | | | | | | | | | | | | | | | | |
| WASH SPRAY | 13 | | ● | | ● | ● | | ○ | | | | | | | | | |
| DET. CUP | 14 | | | | ● | ● | | ● | | | | | | | | | |
| WASH HOT | 15 | | | ● | ● | ● | | ○ | | | | | | | | | |
| WASH COLD | 16 | | | | ● | ● | | | | | | | | | | | |
| STOP | 17 | | | | | ○ | ○ | | | | | | | | | | |
| DRAIN | 18 | | | | ● | | ● | | | | | | | | | | |
| FILL #4 | 19 | | ● | | | ○ | ○ | | | | | | | | | | |
| RINSE HOT | 20 | | | ● | ● | ● | | | | | | | | | | | |
| RINSE COLD | 21 | | | | ● | ● | | | | | | | | | | | |
| STOP | 22 | | | | | ○ | ○ | | | | | | | | | | |
| DRAIN | 23 | | | | ● | | ● | | | | | | | | | | |
| FILL #5 | 24 | | ● | | | ○ | ○ | | ○ | | | | | | | | |
| R-AGENT | 25 | | | | ● | ● | | | ● | | | | | | | | |
| RINSE HOT | 26 | | | ● | ● | ● | | | ○ | | | | | | | | |
| RINSE COLD | 27 | | | | ● | ● | | | | | | | | | | | |
| STOP | 28 | | | | | ○ | ○ | | | | | | | | | | |
| DRAIN | 29 | | | | ● | | ● | | | | | | | | | | |
| HEAT | 30 | | | ● | | | ● | | | | | | | | | | |
| BLO-HOT | 31 | ● | | ● | | | ● | | | | | | | | | | |
| BLO-COLD | 32 | ● | | | | | ● | | | | | | | | | | |
| OFF | 33 | | | | | | ● | | | | | | | | | | |
| ON-READY | 34 | | | | | | ● | | | | | | | | | | |

APPLIANCE ELEMENTS | CYCLES

ELECTRONIC APPLIANCE CONTROL

This is a continuation, of application Ser. No. 325,232, filed Nov. 27, 1981.

BACKGROUND OF THE INVENTION

This invention relates to apparatus for controlling the operation of domestic appliances, such as clothes washers, dishwashers, dryers, and the like, and in particular to an electronic control apparatus which incorporates an electromechanical switching device.

Prior to the advent of solid-state electronic controls, most domestic appliances, such as automatic clothes washers, dishwashers, or dryers, used an electromechanical control device. An example of such a control device is shown in U.S. Pat. No. 2,703,347, issued to Constantine. This patent discloses a motor-driven control having a fixed array of switches sequentially actuated in a predetermined pattern by a cam disc incrementally rotating at a fixed rate to effect the cycling of the appliance through a predetermined sequence of operations over a predetermined period of time. The control was driven by a constant speed motor which acted as a timer to cycle the controlled appliance through desired operations over a period of time necessary, for example, to properly wash a load of dishes or clothing.

While the prior art Constantine device discussed above was highly reliable and relatively inexpensive, the capabilities of this device were severely limited. The cam disc was usually limited to 60 discrete angular positions for each full revolution of the cam disc, with each angular position being 6° apart. The prior art Constantine device was thus limited in its ability to carry out multiple cycle operations or complex cycle operations.

An additional problem with these prior art electromechanical devices was the complexity involved in mechanically implementing the logic required to achieve the desired machine function. Complex programmed machine operations were often accomplished by multiple motor drives for a single or multiple cam and by the addition of one or more manually operated mechanical switches. This arrangement was very intricate mechanically, and was limited in the logic functions it could perform, due to the limited capabilities of the cam-activated mechanical switch.

To provide the capability demanded by modern appliances which have multiple cycles and complex cycle operations, solid-state electronic control devices have been adopted. Examples of such solid-state electronic control devices can be seen in the following U.S. Pat. Nos. 3,464,673, issued to Cargo et al.; 3,539,153, issued to Wennerberg et al.; 3,783,651, issued to Karklys; 3,922,889, issued to Karklys; 3,986,372, issued to Karklys; 4,001,599, issued to Karklys; 4,084,237, issued to Beachem et al.; 4,114,190, issued to Mazuir; 4,195,500, issued to Tobita et al.; and 4,222,250, issued to Torita.

These solid-state control devices have provided programming flexibility to accommodate complex cycle operations and a multiplicity of options in cycle operations. However, these solid-state control devices operated on low voltage, and to control the higher voltage elements of the appliance, such as motors, heaters, valves, and the like, it was necessary to employ various switching devices, such as relays, thyristors, SCR's, and the like. As a result, these solid-state electronic controls were often relatively expensive. In addition, the reliability of the control device was diminished by the plurality of discrete switching devices, such as relays or thyristors, each of which is subject to failure.

SUMMARY OF THE INVENTION

The present invention overcomes the disadvantages of the prior art by providing a control device having the flexibility and programmability of solid-state electronic control devices while having the reliability and low cost of a cam-operated rotary switching device. The electronic appliance control system of the present invention includes means for inputting operation selection instructions from a user and producing a signal therefrom, and means for sensing operational status parameters of the appliance and producing a signal therefrom. A plurality of cam-operated switches are provided each of which is adapted to be connected to operate an appliance function. A rotary camming device is provided with the switches. The rotary camming device is capable of a plurality of discrete angular positions, each position setting the switches in a desired state to produce a desired operational state for the appliance. Feedback means may also be provided for sensing the position of the rotary camming device and providing a signal therefrom. A drive means is provided for turning the rotary camming device to any of the positions. Means are also provided for actuating the drive means to turn the rotary camming device to a desired angular position and for stopping the drive means when the desired position is achieved. A microcomputer is connected to receive the signals from the inputting means and the sensing means and the feedback means. The microcomputer has a preset program stored therein and is capable of performing the program according to the received signals. The microcomputer is connected to operate the controlling means in accordance with the program to turn the rotary camming device and sequentially set the switches in a series of desired positions for sequentially changing the operational states of the appliance and operating the appliance thereby.

The control system of the present invention offers a high number of complex operation sequences for a controlled apparatus, such as an automatic dishwasher, clothes washer, dryer, or the like, since all system operations are controlled by the microcomputer, and the microcomputer may be provided with a complex series of programs. However, since the control system of the present invention avoids the use of expensive and complex electronic switching devices, such as relays, thyristors, or the like, it provides the reliability and low cost which have heretofore been advantages only achievable through the electromechanical switching devices using cam-operated rotary switches.

BRIEF DESCRIPTION OF THE DRAWINGS

A fuller understanding of the invention may be had by referring to the following description and claims, taken in conjunction with the accompanying drawings, wherein:

FIG. 3 is a sequence chart showing a typical programmed series of operations performed by the control system of the present invention.

DETAILED DESCRIPTION OF THE PREFERRED EMBODIMENT

Figure 1:
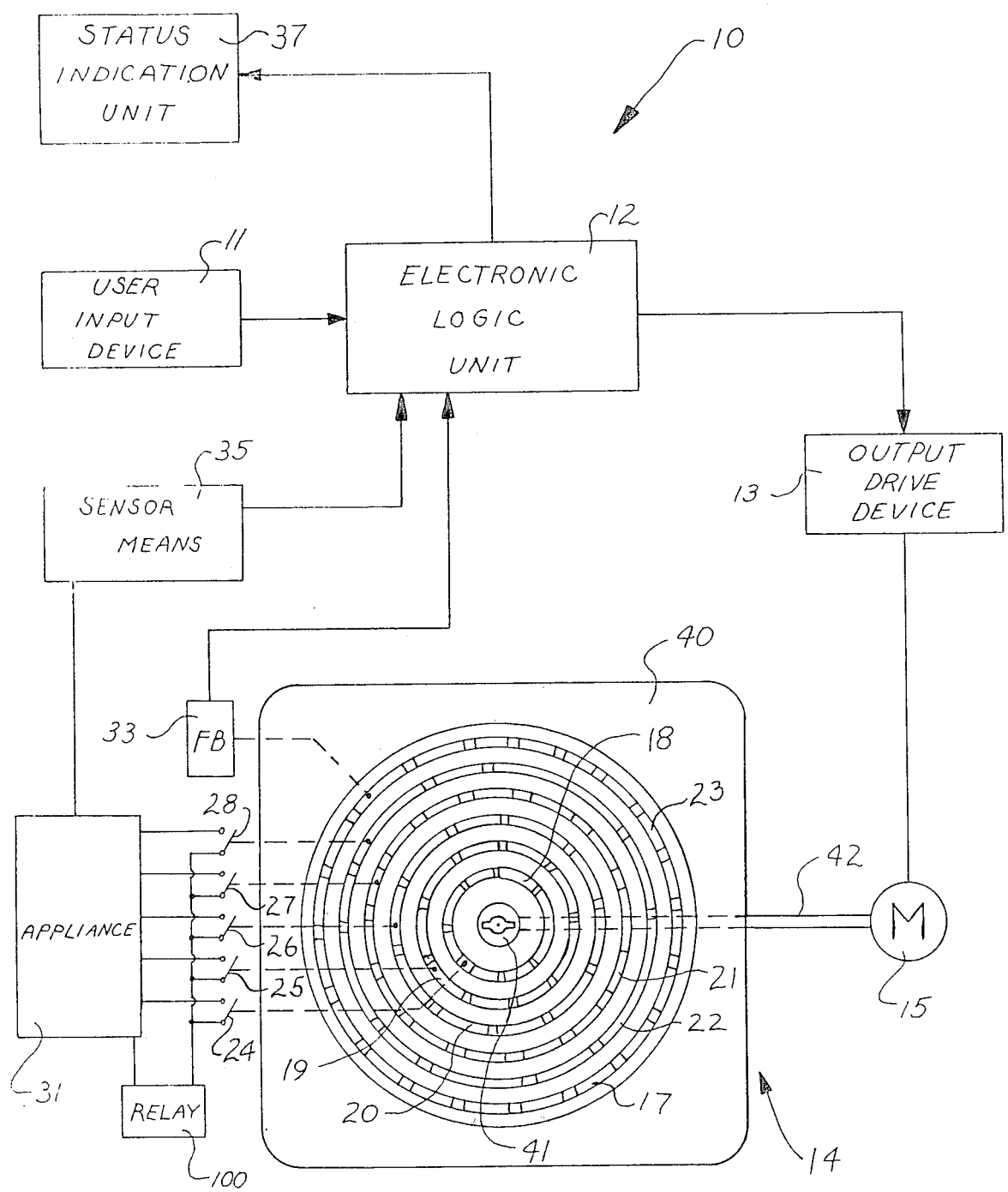
FIG. 1 is a schematic view of the control system of the present invention.

With reference to FIG. 1, there is illustrated an electric appliance control system 10 of the present invention. The system 10 includes a user-input device 11 which may be in the form of a mechanical contact closure-type keyboard with a specific appliance operation associated with each key. The input device 11 is connected to an electronic logic unit 12. The logic unit 12 receives the signals input through the device 11 and translates the user input into a predetermined sequence of operations for each machine element. For this purpose, the logic unit 12 may contain a specific operational program for the particular appliance in which the control system 10 is installed. The logic unit 12 provides command signals in accordance with the program to an output drive device 13, and then operates a mechanical rotary switching device 14. The drive device 13 is used to operate a cam drive means 15, which may be an electric motor or a stepping relay. The cam drive means 15 causes rotation of a cam disc 17. The disc 17 has a plurality of circular cam surface tracks 18-23, which actuate a plurality of mechanical switches 24-28. The switches 24-28 are connected to various elements of the appliance 31 to operate the appliance in a desired manner.

The position of the cam disc 17 is determined by a position feedback device 33 which may be connected to the outer track 23 of the cam disc 17 and may sense the position thereof by means of strobe pulses or various optical encoding techniques. The appliance 31 may also have various sensor means 35 which sense the operational status of various elements of the appliance, such as temperature, fill height, flow rate, and the like. The sensor means 35 may provide an additional input to the electronic logic unit 12. If desired, a status indication unit 37 may be provided to indicate the command selected by the user through the input device 11 and the various status of the execution of these commands by the electronic logic unit 12. The status indication unit 37 is controlled by the electronic logic unit 12, and may be in the form of a digital display, signal lamps, and the like.

The mechanical rotary switching device 14 of the control system is of the general type illustrated in U.S. Pat. No. 2,703,347 to Constantine, which is herein incorporated in its entirety by reference. The switching device 14 includes a housing or frame 40 which provides a bearing-like support constituting an axis of rotation 41 for the rotatable cam disc 17. The cam drive means 15, which may be a small alternating current, fixed speed motor, is supported on the housing 40 and drives the cam disc 17 by a drive shaft 42. The drive motor configuration illustrated is simply an example of one type of drive mechanism that is suitable for operating the mechanical switching device 14. It is contemplated that a reciprocating ratchet-type mechanism of the type disclosed in the above-referenced Constantine patent, or a motor-and-pawl configuration, or a solenoid-type device, or a motor-and-gear configuration could be utilized in place of the gearing configuration illustrated in FIG. 1.

The plurality of mechanical switches 24, 25, 26, 27, and 28 are fixed in position on and supported by the housing 40 relative to the associated respective plurality of circular cam surface tracks 18, 19, 20, 21, and 22, provided concentrically on at least one side of the disc 17. Each switch includes a cam follower-type element that rides on a respective cam surface (at least cam high points) provided on the disc 17, wherein the respective switch is in an opened or closed condition for each angular position of the disc. The array of switches 24-28 is opened and closed in a predetermined selection for each discrete position of the cam disc 17. If desired, both sides of the cam disc 17 may include appropriate arrays of switches and circular cam tracks to permit more complex programming for an associated controlled appliance, such as a dishwasher or clothes washer. Although five switches 24-28 and five tracks 18-22 are illustrated, it should be understood that these are merely representative, and more switches and tracks may be employed. For the purposes of simplification, FIG. 1 only illustrates one side of the cam disc. Most of the switches (e.g., switches 24-28) are used to control appliance elements, such as fill valves, pump motors, water heaters, and the like, during the operation of the appliance, as is known in the art.

While mechanical switching elements such as these have been used before, the pattern on the cam disc has provided the program for the operation of the appliance. Therefore, the capabilities of the mechanical switching device are limited by the amount of information which could be physically incorporated onto the cam disc.

In accordance with the present invention, the cam disc is operated by the program contained in the electronic logic unit 12 so that the disc 17 may be selectively positioned to provide the desired switching function without utilizing the disc as a medium for containing a physical program. Due to the increased capability of large scale integrated circuits, electronic logic unit 12 may contain numerous and complex program operations and intricate time sequences which would be impossible to incorporate through the cam tracks on the disc 17.

Figure 2:
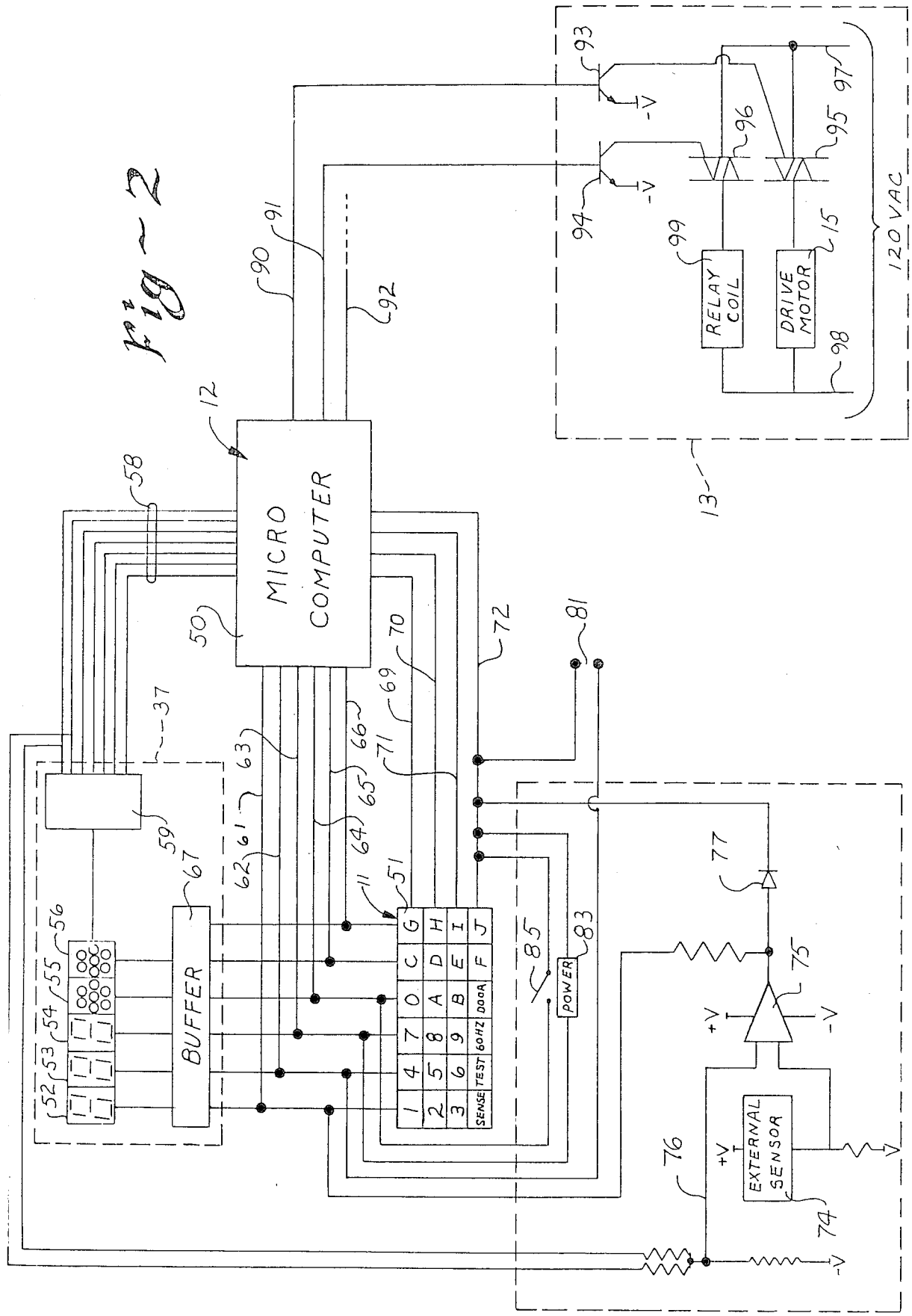
FIG. 2 is a detailed schematic view of a portion of the system of FIG. 1.

The electronic elements of FIG. 1 can be seen in greater detail in FIG. 2. As shown in FIG. 2, the electronic logic unit 12 may be a microcomputer 50 having arithmetic and logic capabilities and a read-only memory containing an operational control program. Suitable microcomputers 50 which may be used are a Type TMS 1000 manufactured by Texas Instruments, and a Type uP7520, manufactured by NEC. The microcomputer 50 receives input command signals from the user-input device 11, which comprises an array of switches 51. The switches 51 may be incorporated in a capacitive touch-control or membrane switch panel of the types which are known in the art. As illustrated in FIG. 2, the input switches 51 may be arranged in a four-by-six matrix array. The microcomputer 50 is also connected to the status indication unit 37, which may contain a plurality of LED or LCD or vacuum florescence display elements 52-56 arranged either in seven-segment form to transmit numerical information (e.g., elements 52-54) or in a discrete form for signal indicators (e.g., elements 55 and 56).

The microcomputer 50 outputs information to the status indication unit 37 and scans the input switches 51, using known scanning techniques. Information for each display element is sequentially output from the microcomputer 50 on seven output display lines 58 to a segment buffer 59. The five LED display elements 52-56 are series-connected to the segment buffer 59. The appropriate display element is activated by the microcomputer 50 via scanning lines 61-65. Each scanning line 61–65 is connected to one of the display elements 52–56 through a digit buffer 67. The scanning line 66 is also connected to the buffer 67, and provides the capability of utilizing an additional display element if desired.

For example, when the leftmost digit is displayed, the seven-segment data for the actuation of the appropriate LED segments in the display element 52 are output from the microcomputer 50 on the lines 58, and simultaneously the microcomputer activates the scanning line 61, providing an enable input to the leftmost display element 52, which then displays the digit as received in seven-segment form through the segment buffer 59.

At the same time that the display is being output, the input switches 51 are scanned to determine which of the switches have been actuated by the user. As shown in FIG. 2, the switches 51 are arranged in an array comprising four vertical columns and six horizontal rows. Each of the switches 51 provides an actuatable connection between one of the scanning lines 61–66 and one of four row-sensing lines 69–72 which are connected to the microcomputer 50. As each of the scanning lines 61–66 is activated sequentially, it activates one of the four vertical columns of switches 51. If one of the switches in an activated column has been depressed by the user, a signal is supplied to the appropriate sensing line 69, 70, 71, or 72, and sensed by the microcomputer 50. The result of the keyboard scanning indicating which of the switches 51 has been depressed is then stored by the microcomputer 50 in a location in its random access memory. The main control program of the microcomputer 50 subsequently senses this keyboard input and performs the necessary sequence of operations in accordance therewith.

The array of input switches 51 provides a plurality discrete inputs to the microcomputer 50. As illustrated in FIG. 2, 24 inputs are provided with ten of these inputs used for inputting one of the numerical digits 0 through 9, and ten other inputs used to selectively input various machine functions or conditions (designated A through J in FIG. 2). The remaining four input locations are used for internal appliance sensors which sense the operational condition of the appliance. These four inputs are labeled "SENSE," "TEST," "60 Hz," and "DOOR." There is no need to provide switches for each of these four sensor inputs. Instead, each of these sensor inputs is provided from the sensor means 35.

The "SENSE" input is provided within the sensor means 35. The sensor means 35 includes an external sensor 74 which may be, for example, a water level indicator, a thermostat, thermister, switch, or the like. When the sensor 74 senses a positive reading, a high voltage level signal is supplied to an amplifier 75. The amplifier output is enabled by a signal from the microcomputer 50 provided on a line 76 connected to two of the output display lines 58 from the microcomputer 50. The line 76 provides the other input to the amplifier 75. The output of the amplifier 75 is used to bias a diode 77 which is inserted in the line between the scanning line 61 and the sensing line 72. When the sensor 74 registers a positive indication, it provides a positive input to the amplifier 75 which biases the diode 77 so that a high level positive signal is provided on the sensing line 72 when the scanning line 61 is high level.

The "TEST" input is provided for field service of appliance. The microcomputer 50 contains a test program which may be executed with the "TEST" input is actuated by a field service technician by externally connecting the scanning line 62 to the sensing line 72 at test points 81. The provision of a test program which may be initiated for field service is known in the art.

The "60 Hz" input is provided from the appliance power supply 83 and provides a 60 pulse per second input which is used by the microcomputer 50 as a clock function. The clock input is provided on the sensing line 72 when the line 63 is scanned.

The "DOOR" input is provided by a switch 85 mounted on the door of the appliance. The switch 85 is connected between the scanning line 64 and the sensing line 72. When the appliance door is closed, the switch 85 is closed, so that when the scanning line 64 is selected, a positive signal is provided on the sensing line 72. When the appliance door is opened, the switch 85 is opened, and this status is sensed on the line 72 when the line 64 is scanned.

The microcomputer 50 contains an internal control program in its read-only memory, and this program is performed in accordance with the user input and the condition sensing received by the microcomputer on the sensing lines 69–72 in response to the scanning lines 61–66. As the microcomputer 50 performs the program, it rotates the cam disc 17 to a series of positions. Each discrete angular position of the cam disc 17 sets the mechanical switches 24–28 in a desired position to perform the particular appliance function. By way of example, there may be 60 discrete angular positions in which the cam disc 17 is capable of being positioned. Thus, there may be 60 different permutations of switch settings for the switches 24–29 which may be achieved by the disc 17. The microcomputer 50 can select any of these 60 permutations, depending upon the program being executed in the microcomputer, and this program will depend upon the inputs to the computer from the input switches 51.

The microcomputer 50 controls the positioning of the cam disc 17 through signals on a plurality of output control lines 90, 91 and 92. Each of the lines 90 and 91 is connected to the base of a transistor 93 or 94 having the emitter connected to the negative voltage source and the collector providing the gate electrode for an alternating current, gate-controlled thyristor switch 95 or 96. Each of the switches 95 and 96 may be a Triac. ("Triac" is a trademark of The General Electric Company, of Syracuse, New York.) The switch 95 is series-connected, between lines 97 and 98 forming a 120 volt a.c. supply, with the drive motor 15 which rotates the cam disc 17. Thus, when the microcomputer 50 wishes to change the position of the cam disc 17, a signal is provided on the line 90 to close the switch 95 and activate the drive motor 15. When the cam disc 17 is in the desired position so that the switches 24–29 are properly set, the signal on the line 90 is deactivated to open the switch 95 and stop the motor 15 to stop the rotation of the disc 17. The switch 96 is series-connected with a relay coil 99 which operates a relay 100 (FIG. 1) in the appliance power supply to disconnect power from the appliance functions operated by the switches 24–28 when the disc 17 is being positioned by the motor 15. The relay 100 prevents inadvertent operation of machine function when the disc 17 is being moved from position to position when the cam tracks 18–23 may momentarily actuate the switches 24–28.

If desired, an optical coupler may be provided between the microcomputer 50 and the transistors 93 and 94 to isolate the 120-volt a.c. circuit portion from the lower voltage electronic control circuit.

The line 92 and additional lines like it may be provided from the microcomputer 50 to directly operate certain appliance functions without using the mechanical switching device 14. For example, it may be desirable to use a relay-operated heater in a clothes dryer, and the heater relay may be operated directly by the microcomputer via the line 92.

While the control program contained in the microcomputer 50 will vary, depending upon the appliance in which the control system is used, an example of a control program used for an electric dishwasher may be described with reference to FIG. 3. In FIG. 3, eight controls of machine elements are illustrated: "Blower," "Water Valve," "Heater," "Main Motor," "Wash Phase," "Drain Phase," "Detergent Cup," and "Rinse Conditioner." For each of these eight machine elements, a mechanical switch S1-S8, such as the switches 24-28 of FIG. 1, would be provided. Thirty-four different discrete switch settings are shown in FIG. 3. A discrete appliance operation is associated with each of these 34 switch settings, e.g., "Drain," "Fill #1," "Wash-Hot," "Wash-Cold," etc. FIG. 3 also shows six different appliance operation sequences which may be performed. These six sequences are labeled: "Sani-Wash," "Heavy Wash," "Dual-Regular," "Low Energy-Regular," "Rinse and Hold," and "Power Dry." Each of these six sequences is selected by the user through actuation of one of the input switches 51 (FIG. 2) and they may be provided on an input control panel in the locations designated A through J.

If the "Sani-Wash" sequence is selected by the user, the program in the microcomputer 50 performs each of the indicated 34 switch settings sequentially. The duration during which each switch setting is maintained depends upon the time designated by the program. For example, to begin the "Sani-Wash" cycle, the cam disc 17 is positioned in position #1, labeled "Drain" in FIG. 3, so that switches S1, S5, and S7 are closed. This actuates the main motor and opens the drain valve so that all of the water from the main dishwasher compartment is pumped out. After a predetermined period of time necessary to empty the compartment of water, the microcomputer 50 sets the cam disc 17 in position #2, labeled "Fill #1," in which switches S3, S6, and S7 are closed. This opens the water valve and changes the actuation of the phase windings on the main motor from the phase windings for draining to those for washing. This sequence may be carried on for a predetermined period of time or, preferably, until a water level switch senses that the compartment is filled. The water level switch may be the sensor 74 (FIG. 2). Thereafter, the computer positions the disc in position #3, labeled "Wash-Hot" in which the switches S4, S5, and S6 are closed, so that the heater is on and the main motor is operating in the washing phase. The remaining operations are carried out as shown in FIG. 3.

If a different sequence of operations is selected by the user, the program in the microcomputer 50 will perform only those steps and sequence of operations necessary to perform that cycle. For example, if the user designates the sequence labeled "Rinse and Hold," the computer will perform only the steps of operation indicated by cam positions Nos. 1, 2, 4, 5, 33, and 34. Each of these steps will be performed in the required order and the duration of each step will depend upon the time designated to perform each step as contained in the program, plus the input from any machine functions as sensed by the sensing means 35.

While the capabilities of the dishwasher control depicted in FIG. 3 are relatively simple, it can be seen that the appliance control system 10 of the present invention is capable of performing much more complex appliance control operations having as many as 60 or more different permutations of switch settings which, if required, may be repeated, and in which the switch setting may be performed in any order desired in order to achieve the desired machine operation sequence.

Although a preferred embodiment of the invention has been shown and described, it should be understood that various modifications and rearrangements of the parts may be resorted to without departing from the scope of the invention as disclosed and claimed herein.

What is claimed is:

1. A controller for an appliance having a plurality of selectively energizeable electromechanical components, comprising:
   input means for operator selection of a desired cycle of operation of said appliance;
   a motor;
   switching means coupled to be driven by said motor and having a plurality of timing cams on a rotating member for controlling the operation of a plurallity of switches for applying power to energize said components; and
   sequencing means for selectively advancing said switching means including:
   means for applying power to said motor;
   means on said rotating member for defining incremental positions around said rotating member;
   means for detecting movement of said rotating member from one of said positions to the next adjacent position;
   means separate from said rotating member and responsive to the selected operation cycle for defining a program for said rotating member which includes a series of operating steps each including a number of incremental positions to be moved and a time delay of operation; and
   means for operating said power applying means to move said rotating member a defined number of incremental positions in accordance with said program.

2. The controller according to claim 1, wherein said sequencing means further includes means for timing a defined interval between successive actuations of said power applying means in accordance with said program.

3. The controller according to claim 1, wherein said defining means on said rotating member includes:
   a cam track on said rotating member including a plurality of spaced teeth; and said detecting means includes:
   a cam follower associated with said cam track; and
   switching means coupled to said cam follower for providing a first circuit condition when said cam follower is in contact with one of the tips of said teeth and providing a second circuit condition when said cam follower is in contact with one of the roots of said teeth.

4. The controller according to claim 1, wherein said sequencing means includes a programmed microcomputer.

* * * * *

UNITED STATES PATENT AND TRADEMARK OFFICE
CERTIFICATE OF CORRECTION

PATENT NO. : 4,743,820

DATED : May 10, 1988

INVENTOR(S) : Wayne Veach

It is certified that error appears in the above-identified patent and that said Letters Patent is hereby corrected as shown below:

On the face of the patent please insert:

-- [73] Assignee: France/Scott Fetzer Company, --.

Signed and Sealed this

Twenty-second Day of November, 1988

Attest:

DONALD J. QUIGG

Attesting Officer     Commissioner of Patents and Trademarks